US009536080B2

(12) United States Patent
Kerr et al.

(10) Patent No.: US 9,536,080 B2
(45) Date of Patent: Jan. 3, 2017

(54) METHOD FOR VALIDATING DYNAMICALLY LOADED LIBRARIES USING TEAM IDENTIFIERS

(71) Applicant: Apple Inc., Cupertino, CA (US)

(72) Inventors: Gregory I. Kerr, Cupertino, CA (US); Pierre-Olivier J. Martel, Mountain View, CA (US); Love Hornquist Astrand, Cupertino, CA (US); Peter Kiehtreiber, Cupertino, CA (US); Ivan Krstic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 14/726,292

(22) Filed: May 29, 2015

(65) Prior Publication Data

US 2016/0350529 A1    Dec. 1, 2016

(51) Int. Cl.
*G06F 21/51* (2013.01)
*G06F 21/52* (2013.01)
*G06F 21/64* (2013.01)

(52) U.S. Cl.
CPC ............... *G06F 21/52* (2013.01); *G06F 21/51* (2013.01); *G06F 21/64* (2013.01); *G06F 2221/033* (2013.01)

(58) Field of Classification Search
CPC ...................................................... G06F 21/51
See application file for complete search history.

(56) References Cited

U.S. PATENT DOCUMENTS

| | | | |
|---|---|---|---|
| 5,926,624 A * | 7/1999 | Katz | G06Q 20/1235 707/999.104 |
| 8,020,001 B2 | 9/2011 | Lundblade et al. | |
| 8,595,715 B2 | 11/2013 | Ward et al. | |
| 8,918,370 B2 | 12/2014 | Baker et al. | |
| 9,009,693 B2 | 4/2015 | St. John et al. | |
| 9,015,702 B2 | 4/2015 | Bhat | |
| 9,405,515 B1 * | 8/2016 | Bertram | G06F 8/41 |
| 9,405,906 B1 * | 8/2016 | Sheth | G06F 21/565 |
| 2004/0025022 A1 * | 2/2004 | Yach | G06F 21/121 713/176 |
| 2006/0074985 A1 * | 4/2006 | Wolfish | G06Q 20/322 |
| 2007/0198841 A1 * | 8/2007 | Lundblade | G06F 21/52 713/176 |

* cited by examiner

*Primary Examiner* — Saleh Najjar
*Assistant Examiner* — Khang Do
(74) *Attorney, Agent, or Firm* — Blakely, Sokoloff, Taylor & Zafman LLP

(57) ABSTRACT

According to one embodiment, in response to a request received from an application by a launch module hosted by an operating system and executed by a processor to dynamically load a library, a library validation module hosted by the operating system extracts a first team identifier (ID) from the application, where the first team ID identifies an application provider that provides the application. The library validation module extracts a second team ID from the library, where the second team ID identifies a library provider that provides the library. The first team ID and the second team ID are compared to determine whether the first team ID matches the second team ID. In response to determining that the first team ID matches the second team ID, the launch module launches the library to allow the application communicate with the library; otherwise, the request is denied.

25 Claims, 8 Drawing Sheets

METHOD FOR VALIDATING DYNAMICALLY LOADED LIBRARIES USING TEAM IDENTIFIERS

FIELD OF THE INVENTION

Embodiments of the present invention relate generally to data processing systems. More particularly, embodiments of the invention relate to verifying dynamically loaded libraries based on team identifiers.

BACKGROUND

Security concerns for all types of processor-based electronic devices, and particularly for computing devices, have become a significant concern. While some concerns may relate to detrimental actions which may be undertaken by defective code implemented by such devices, the greater concerns relate to the ramifications of various types of attacks made upon such devices through malicious code, including code conventionally known in the field by a number of names, including "viruses," "worms," "Trojan horses," "spyware," "adware," and others. Such malicious code can have effects ranging from relatively benign, such as displaying messages on a screen, or taking control of limited functions of a device; to highly destructive, such as taking complete control of a device, running processes, transmitting and/or deleting files, etc. Virtually any type of imaginable action on a processor-based device has been the subject of attacks by malicious code.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

Applications are among the most critical elements of a modern security architecture. While applications provide amazing productivity benefits for users they also have the potential to negatively impact system security, stability, and user data if they are not handled properly. An application may be executed within a restricted operating environment such as a sandbox or virtual machine to prevent the application from accessing any resource beyond the restricted operating environment. In another method, an application may be executed only if the application has been authorized by a trusted source. However, such authorization is typically provided when the application is distributed prior to the execution. However, it does not prevent an application from dynamically loading a library that the application is not entitled to communicate, even if the library may be authorized by the trusted source.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, each software component (e.g., a third-party application, a third-party library) deployed and hosted by an operating system (OS) of a data processing system may be associated with a team identifier (ID). A team ID (also referred to as a developer ID) may uniquely identify a software provider or developer or a group of developers who developed or provided the application. In one embodiment, when an application attempts to load a library, a first team ID is obtained from the application and a second team ID is obtained from the library. The first team ID and the second team ID are compared. The application is permitted to load and communicate with the library only if the first team ID and the second team ID are matched. In such a way, an application is only allowed to load and communicate with a library that was provided by the same developer or entity (e.g., its own library).

In one embodiment, an application that is bundled with an operating system or preinstalled software (e.g., manufacture software bundle) associated with a data processing system can only load and communicate with a library that comes with the bundle. Such an application is referred to herein as a first-party application and such a library is referred to herein as a first-party library. In another embodiment, an application that is installed by a user after the operating system and/or the preinstalled bundle have been installed, referred to herein as a third-party application, may be allowed to load and communicate with its own library (e.g., a library with matching team ID) and/or a first-party library (e.g., a library without a team ID or with a default team ID identifying a manufacturer). By matching team IDs between an application and a library to be loaded, it can be determined whether the application is entitled to load that particular library.

Figure 1:
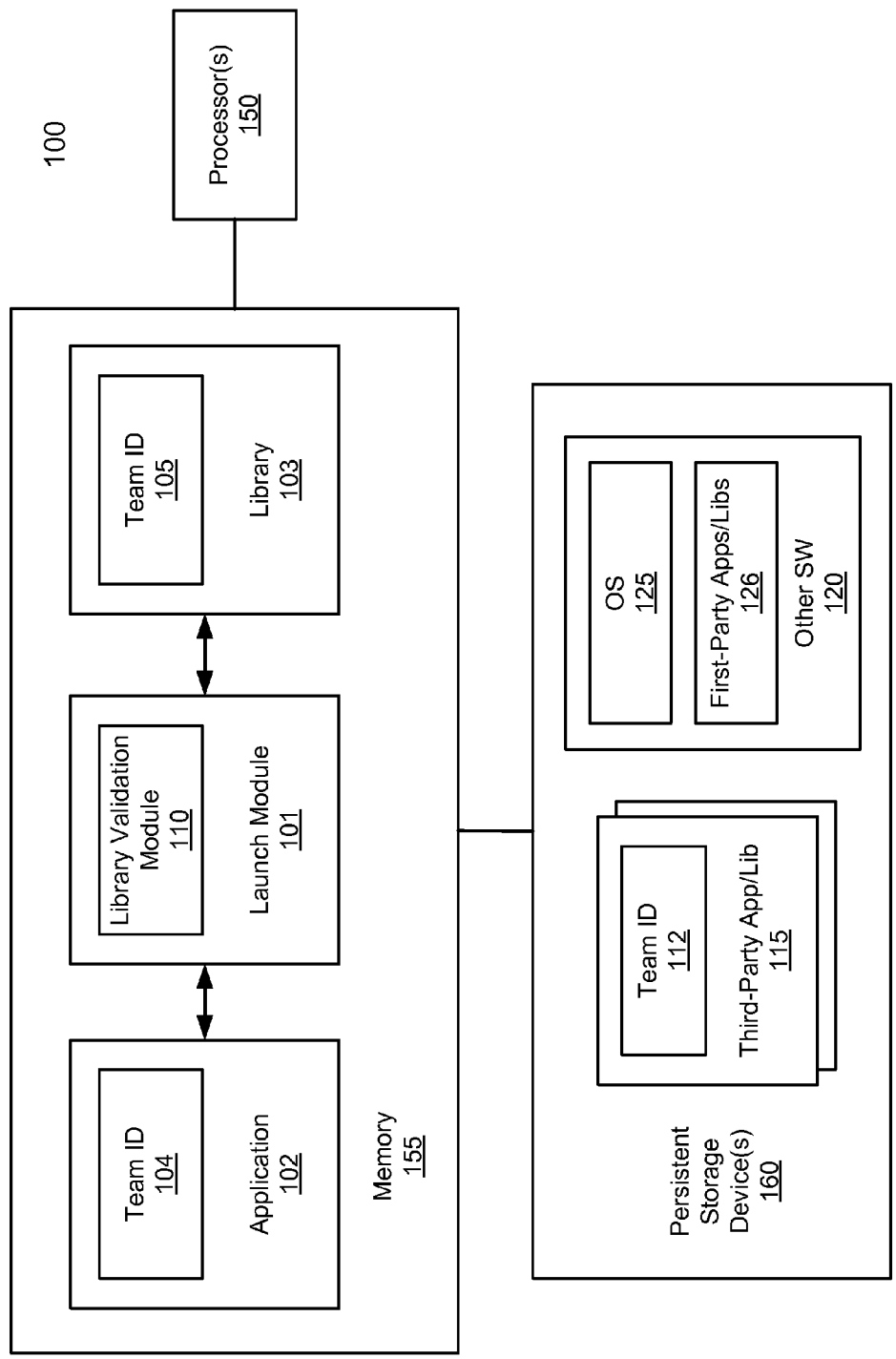
FIG. 1 is a block diagram illustrating a data processing system according to one embodiment of the invention.

FIG. 1 is a block diagram illustrating a data processing system according to one embodiment of the invention. Referring to FIG. 1, system 100 represents any kind of data processing systems, such as, for example, a server, a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof.

In one embodiment, system 100 launch module 101 loaded in memory 155 and executed by processing resources, in this example, processor 150. Processing resources may present one or more processors or processor cores. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. A processor may be a general-purpose processor such as a central processing unit (CPU).

Launch module 101 may be a part of an operating system (OS) running and executed by the processing resources within the system. An operating system is a collection of software that manages computer hardware resources and provides common services for computer programs. The operating system is an essential component of the system software in a computer system. Application programs usually require an operating system to function. Amongst many functionalities of an operating system, scheduling is the method by which threads, processes or data flows are given access to system resources (e.g. processor time, communications bandwidth). This is usually done to load balance and share system resources effectively or achieve a target quality of service. In addition, an operating system may further include other core components, such as a scheduler, a device manager, a kernel, etc. In order not to unnecessarily obscure embodiments of the present invention, these components are not shown herein. An operating system may be any kind of operating systems, such as, for example, iOS™ or OS X™ from Apple®, Android™ from Google®, Windows™ from Microsoft®, or other operating systems (e.g., UNIX, LINUX, real-time or embedded operating systems).

A variety of software programs, such as application 102 and library 103 can be loaded into memory 155 and executed by processor 150. Application 102 may be a third-party application that is part of third-party applications and/or libraries 115 stored in persistent storage device 160. Alternatively, application 102 may be a first-party application as part of first-party application 126 of software 120. Software 120 may also include other software components or programs such as operating system 125. Similarly, library 103 may be a third-party library as part of third-party libraries 115 or a first-party library as part of first-party libraries 126.

A third-party program (e.g., third-party application or third-party library) may be authorized and signed with a certificate associated with an entity (e.g., software development entity or company) that provides the third-party program, also referred to as a developer certificate. A first-party program (e.g., application, library, application framework) may be authorized and signed with a certificate by a trusted source or trusted authority associated with a provider of an operating system (e.g., Apple) hosting the programs. That is, a first-party program may be signed with a certificate that is different from a certificate used to sign a third-party program. For example, according to one embodiment, the operating system and the system software or libraries that are associated with the operating system may be signed by a first certificate provided by a software provider associated with the operating system. A third-party program hosted by the operating system, which invokes a service provided by the operating system or system software, may be signed by a second certificate that is different from the first certificate. The second certificate may be associated with a software developer of the third-party program. Note that a third-party program may be bundled with a first-party program. A first-party program may be installed after a third-party program has been installed. However, the certificates to sign the first-party program and the third-party program are different. A code verifier or validation module can distinguish a first-party program from a non-first-party program based on the types of their respective certificates that signed the programs.

In one embodiment, each of thirty-party applications and libraries 115 is associated or inserted with a team ID (e.g., team ID 112) that is certified or provided by a trusted source or trusted entity (e.g., the manufacturer or distributor). A first-party application or library may not be associated with a team ID. Alternatively, a first-party application or library may be associated with a team ID that uniquely identifies the corresponding manufacturer or distributor of system 100 (e.g., Apple ID). Note that a first-party application or library may represent any of programs, libraries, frameworks, plugin bundles, or other standard or default software components that are distributed together with the operating system or data processing system.

In one embodiment, launch module 101 receives a request from application 102 to load and communicate with library 103. Application 102 may be a third-party application or a first-party application. In response to the request, launch module 101 invokes a library validation module 110 to validate library 103 to determine whether application 102 is entitled to load and communicate library 103. In one embodiment, library validation module 110 extracts team ID 104 (e.g., a first team ID) from application 102 and extracts team ID 105 (e.g., a second team ID) from library 103. Team IDs 104-105 can be extracted from binary images of application 102 and library 103, respectively. Library validation module 110 then compares team ID 104 with team ID 105 to determine if they match. If team ID 104 matches team ID 105, it means application 102 and library 103 may be developed by the same entity (e.g., same developer or same group of developers). As a result, application 102 is allowed to load and communicate with library 103 if both team IDs 104-105 match; otherwise, the request is denied.

According to one embodiment, dependent upon the specific configuration, an application may be allowed to dynamically load and communicate with a library that was provided by the same entity (e.g., same team ID) or a library that comes with the operating system or data processing system 100 (e.g., a first-party component). Thus, a third-party application can dynamically load and communicate with its own third-party library and it can also communicate with a first-party library. However, a first-party application can only dynamically load and communicate with a first-party library.

In one embodiment, when application 102 attempts to load library 103, library validation module 110 determines whether application 102 is a third-party application and whether library 103 is a third-party library. This can be done by examining whether application 102 and/or library 103 are installed at certain directories in a file system of the operating system. Typically, first-party components are installed in a different directory then third-party components. Alternatively, the operating system may maintain a list of hashes or fingerprints of the first-party components that are distributed with the operating system. If a component is a third-party component, its fingerprint or hash may not be found in the list. If a fingerprint of a component is found in the list, such a component is a first-party component.

In one embodiment, if it is determined that application 102 is a third-party application and library 103 is a first-party library, application 102 is then allowed to load and communicate with library 103. If application 102 is a third-party application and library 103 is also a third-party library, their team IDs will be examined to determine whether they match. In this situation, application 102 can load library 103 only if their team IDs match. Otherwise, the request will be denied. If it is determined that application 102 is a first-party application and library 103 is also a first-party library, application 102 is allowed to load and communicate with library 103. However, if application 102 is a first-party application, but library 103 is a third-party library, the request will be denied.

Note that the techniques described throughout this application can also be applied to a variety of scenarios in which a first program attempts to load and/or communicate with a second program. A program represents an application, a library (such as a dynamically linked library or DLL), a framework, a plugin, an extension, a system component (e.g., kernel component) of an operating system, or even a hardware component or device, etc. The techniques can be utilized to determine whether a first program is entitled to load and/or communicate with a second program. For example, a software company may develop different versions or flavors of a library that may be developed by different teams or divisions and certain features of the library may be valid to some client applications but not others.

In one embodiment, team ID 104 may be inserted into the binary image of application 102 and signed using a first certificate provided by a trusted source (not shown), in this example, a provider of an operating system or data processing system 100. Similarly, team ID 105 may be inserted into the binary image of library 103 and signed using a second certificate provided by a trusted source (not shown). That is, team IDs 104-105 may be part of signatures associated with application 102 and library 103, respectively. Prior to examining team IDs 104-105, library validation module 110 may examine whether the first and second certificates are still valid (e.g., has not expired). If any of the certificates has expired, launch module 101 may deny the request. If a certificate is valid, a team ID may be extracted from a predetermined field of the corresponding certificate. Alternatively, the team ID may be extracted from a predetermined location (e.g., offset) from the binary image. Furthermore, the team ID may be specified as part of an entitlement (e.g., resource entitlement) or other metadata of a program that indicate what resources the program is entitled to access, etc.

According to some embodiments, once the OS kernel has started, it controls which user processes and applications can be run. To ensure that all applications come from a known and approved source and have not been tampered with, the OS requires that all executable code be signed using a trusted certificate. The applications provided with the device, like mail and browser, are typically signed by a trusted source such as Apple. Third-party applications must also be validated and signed using a trusted certificate. Mandatory code signing extends the concept of chain of trust from the OS to applications, and prevents third-party applications from loading unsigned code resources or using self-modifying code.

In order to develop and install applications on devices, developers must register with a trusted source (e.g., Apple) and join a certified developer program. The real-world identity of each developer, whether an individual or a business, is verified by the trusted source before their certificate is issued. This certificate enables developers to sign applications and submit them to a software distributor, such as, an App Store, for distribution. As a result, all applications in the App Store have been submitted by an identifiable person or organization, serving as a deterrent to the creation of malicious applications. They have also been reviewed by a trusted source to ensure they operate as described and do not contain obvious bugs or other problems.

The operating system allows developers to embed frameworks inside of their apps, which can be used by the application itself or by extensions embedded within the application. To protect the system and other applications from loading third-party code inside of their address space, the system will perform a code signature validation of all the dynamic libraries that a process links against at launch time. This verification is accomplished through the team identifier (Team ID), which is extracted from a trusted certificate. In one embodiment, a team identifier is a 10-character alphanumeric string; for example, 1A2B3C4D5F. A program may link against any platform library that ships with the system or any library with the same team identifier in its code signature as the main executable. Since the executables shipped as part of the system do not have a team identifier, they can only link against libraries that ship with the system itself.

Figure 2:
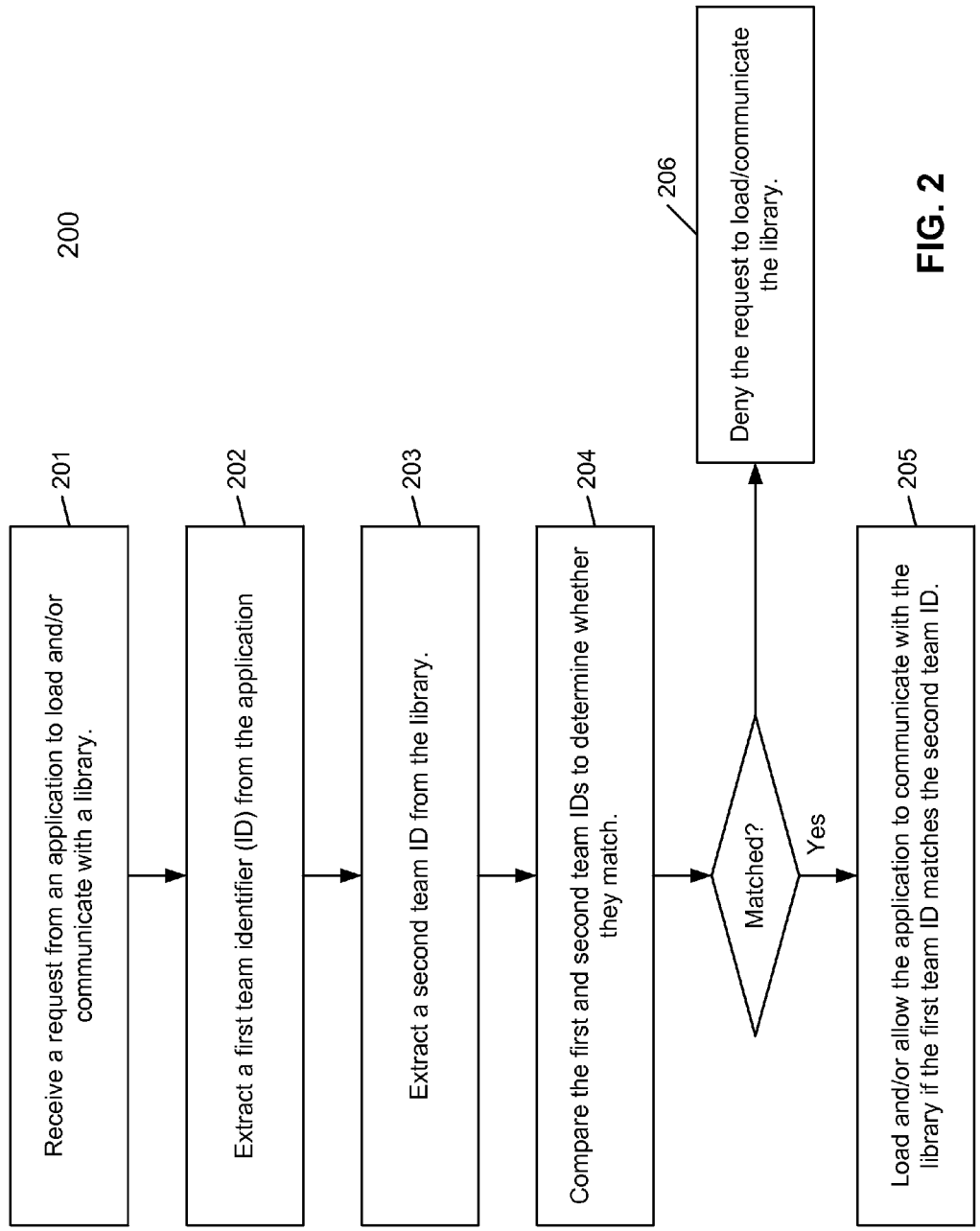
FIG. 2 is a flow diagram illustrating a process of validating a library to be loaded by an application according to one embodiment of the invention.

FIG. 2 is a flow diagram illustrating a process of validating a library to be loaded by an application according to one embodiment of the invention. Process 200 may be performed by processing logic that includes hardware (e.g. circuitry, dedicated logic, etc.), software (e.g., embodied on a non-transitory computer readable medium), or a combination thereof. For example, process 200 may be performed by launch module 101 and/or library validation module 110 of FIG. 1. Referring to FIG. 2, at block 201, processing logic receives a request from an application to load and/or communicate with a library. At block 202, in response to the request, processing logic extracts a first team ID from the application, and at block 203, processing logic extracts a second team ID from the library. At block 204, processing logic compares the first team ID with the second team ID to determine whether they match. If so, at block 205, the application is allowed to load and/or communicate with the library. Otherwise, the request is denied at block 206.

Figure 3:
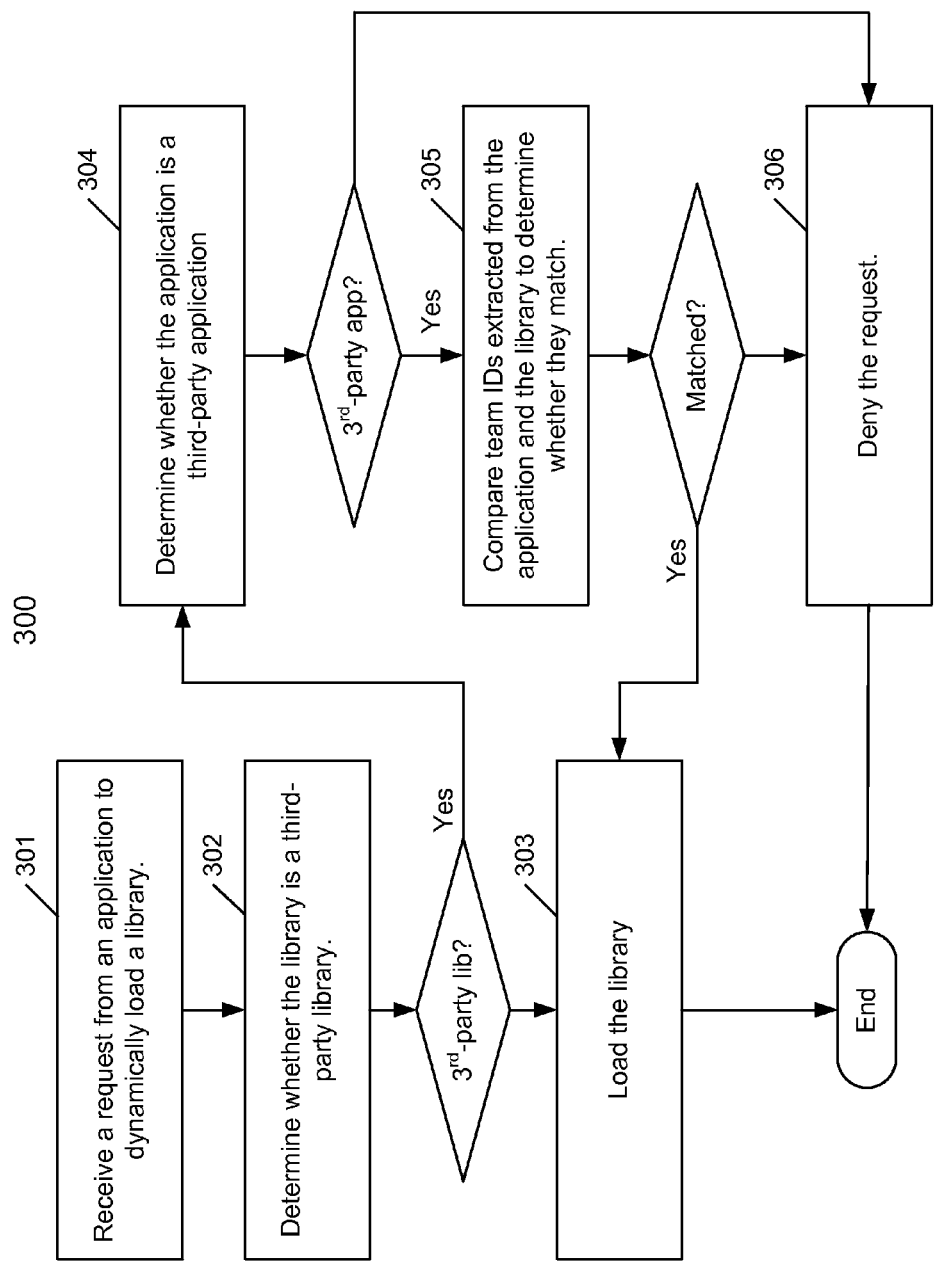
FIG. 3 is a flow diagram illustrating a process of validating a library to be loaded by an application according to another embodiment of the invention.

FIG. 3 is a flow diagram illustrating a process of validating a library to be loaded by an application according to another embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by launch module 101 and/or library validation module 110 of FIG. 1. Referring to FIG. 3, at block 301, processing logic receives a request from an application to load and/or communicate with a library.

At block 302, processing logic determines whether the library to be loaded is a third-party library. For example, processing logic may determine whether the library has been installed in a predetermined directory that is configured to store third-party programs. Alternatively, processing logic may examine the binary image of the library to determine whether the binary image contains a predetermined pattern or signature, such as, for example, a team ID. Furthermore, processing logic may perform a hash operation on the binary image to generate a fingerprint of the library and compares the fingerprint with a set of predetermined fingerprints. If the fingerprint of the library is included in the set of predetermined fingerprints, the library is a first-party library. Otherwise, the library is a third-party library.

If the library is a first-party library, at block 303, the application is allowed to load and/or communicate with the library. If the library is a third-party library, at block 304, processing logic determines whether the application is a third-party application. For example, processing logic may determine whether the application has been installed in a predetermined directory that is configured to store third-party programs. Alternatively, processing logic may examine the binary image of the application to determine whether the binary image contains a predetermined pattern or signature, such as, for example, a team ID. Furthermore, processing logic may perform a hash operation on the binary image to generate a fingerprint of the application and compares the fingerprint with a set of predetermined fingerprints. If the fingerprint of the application is included in the set of predetermined fingerprints, the application is a first-party application. Otherwise, the application is a third-party application.

If the application is a third-party application, at block 305, processing logic compares the team IDs extracted from the application and the library to determine whether they match. If the team IDs match, at block 303, the application is allowed to load and/or communicate with the library; otherwise at block 306, the request is denied. If the application is a first-party application determined at block 304, and since the library is a third-party library determined at block 302, the request is denied at block 306.

Referring back to FIG. 1, in one embodiment, team ID 104 may be inserted into the binary image of application 102 and signed using a first certificate provided by a trusted source (not shown), in this example, a provider of an operating system or data processing system 100, during the development of application 102. Similarly, team ID 105 may be inserted into the binary image of library 103 and signed using a second certificate provided by a trusted source (not shown), during the development of application 102. That is, team IDs 104-105 may be part of signatures associated with application 102 and library 103, respectively. Prior to examining team IDs 104-105, library validation module 110 may examine whether the first and second certificates are still valid (e.g., has not expired). If any of the certificates has expired, launch module 101 may deny the request. If a certificate is valid, a team ID may be extracted from a predetermined field of the corresponding certificate. Alternatively, the team ID may be extracted from a predetermined location (e.g., offset) from the binary image.

Figure 4:
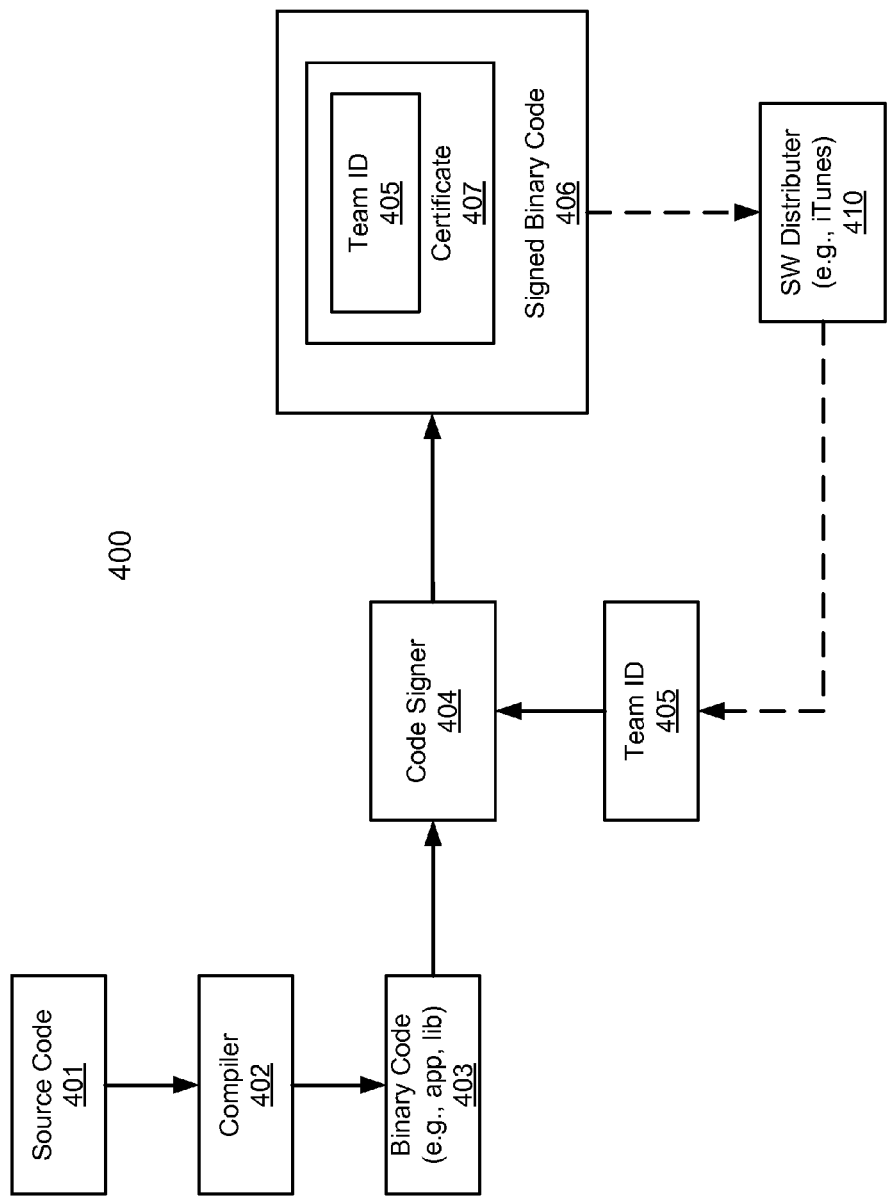
FIG. 4 is a workflow of compiling and generating binary images of programs with team identifiers according to one embodiment of the invention.

FIG. 4 is a workflow of compiling and generating binary images of programs with team identifiers according to one embodiment of the invention. Workflow 400 may be performed by a software development platform. Referring to FIG. 4, when a software developer develops source code 401, source code 401 is compiled by compiler 402 to generate binary code 403. Binary code 403 is processed by code signer 404, which may be processing logic associated with the developer platform, where code signer 404 may be implemented in software, hardware, or a combination of both. Code signer 404 inserts team ID 405, which is provided and certified by software distributor 410 (e.g., Apple), into binary code 403 and signs using a certificate that is authorized by a trusted source such as software distributor 410. As a result, signed binary code 406 is generated having certificate 407 and team ID 405. Binary code 406 may be then distributed by software distributor 410 subsequently. Team ID 405 may be utilized to determine whether binary code 406 is entitled to load and/or communicate with another program at run time as described above. In one embodiment, when inserting the team ID, code signer 404 may copy a team ID from a certificate associated with an entity that develops binary code 403 and insert the team ID into another location (e.g., code directory, header, or other metadata or attributes) within a binary image of binary code 403. In one embodiment, when a certificate issued from a trusted source (e.g., software distributor 410) to a software development entity, a team ID corresponding to that software development entity is embedded as part of the certificate. When binary code 403 is generated to be released, the code signing module 404 extracts or copies the team ID from the certificate and inserts the team ID into another place within the binary code image 403 prior to signing the binary code image to become signed binary code 406. Subsequently, when binary code 406 is launched, the two team IDs may be compared as part of verification of integrity of the binary code 406.

Figure 5:
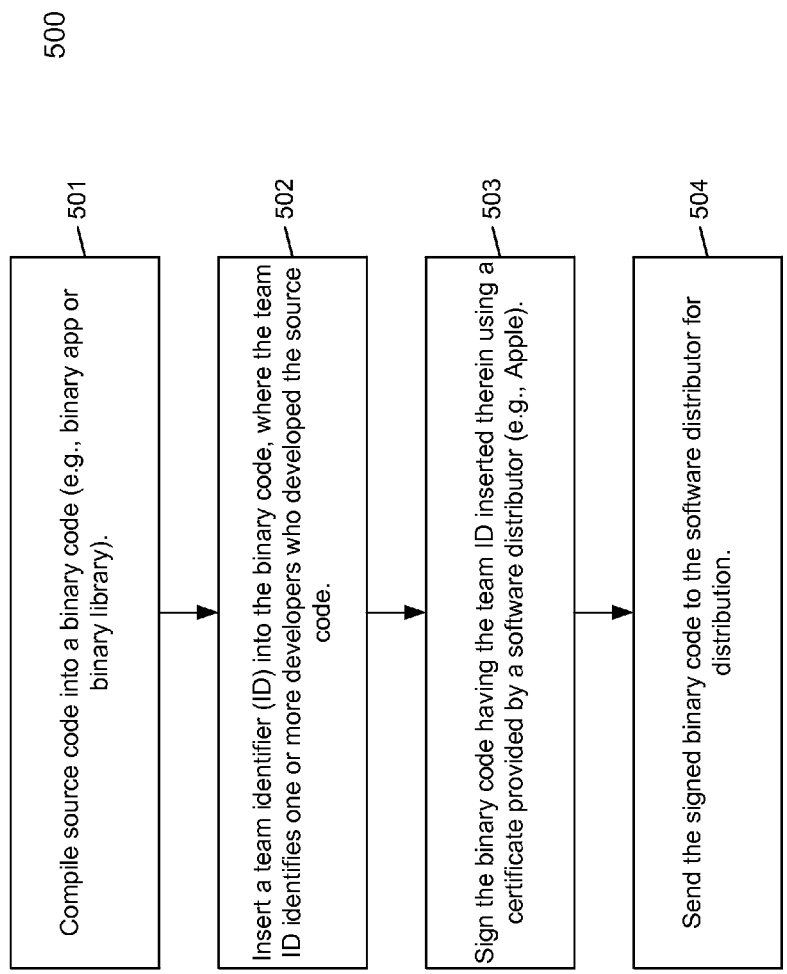
FIG. 5 is a flow diagram illustrating a process of signing binary code with a team identifier embedded therein according to one embodiment of the invention.

FIG. 5 is a flow diagram illustrating a process of signing binary code with a team identifier embedded therein according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by a software development platform as described with respect to FIG. 4. Referring to FIG. 5, at block 501, processing logic compiles source code into binary code (e.g., executable image of an application or a library). At block 502, processing logic inserts a team ID into the binary code, where the team ID identifies one or more developers who developed the source code. At block 503, processing logic signs the binary code having the team ID embedded therein using a certificate provided by a trusted source such as a software distributor (e.g., Apple). At block 504, the signed binary code is then sent to a software distributor for distribution. In one embodiment, when inserting the team ID, processing logic may copy a team ID from a certificate associated with an entity that develops the application and/or library and insert the team ID into another location (e.g., code directory, header, or other metadata or attributes) within a binary image of the binary code. Typically, when a certificate issued from a trusted source to a software development entity, a team ID corresponding to that software development entity is embedded as part of the certificate. When the binary code of is generated to be released, the code signing module extracts or copies the team ID from the certificate and inserts the team ID into another place within the binary code image prior to signing the binary code image.

Figure 6:
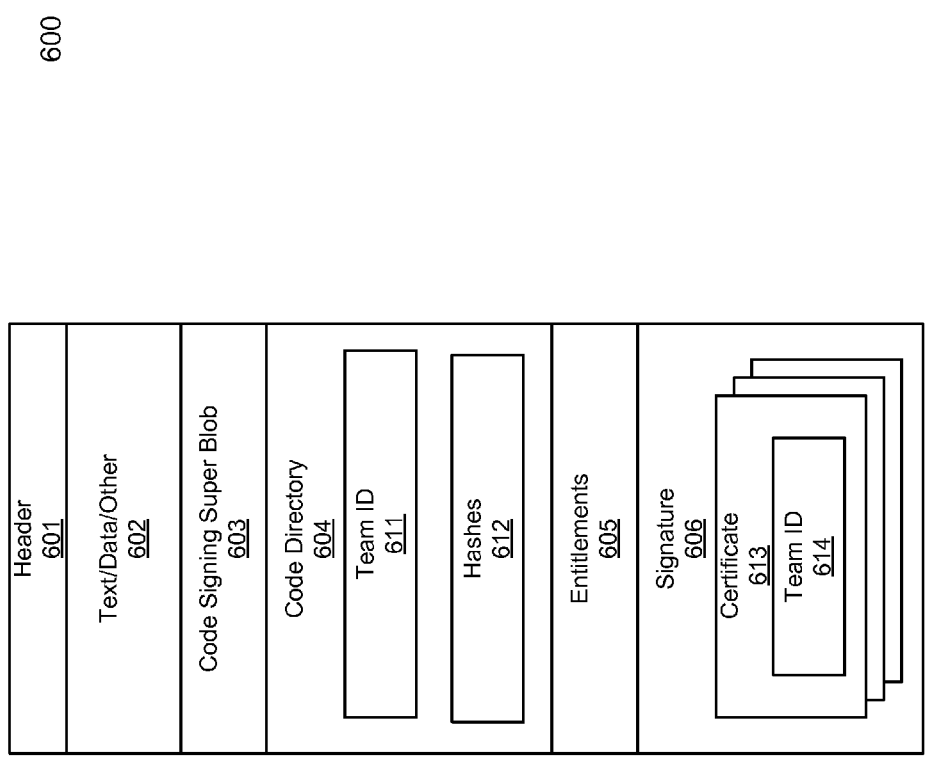
FIG. 6 is a block diagram illustrating a portion of a binary code image according to one embodiment of the invention.

FIG. 6 is a block diagram illustrating a portion of a binary code image according to one embodiment of the invention. Binary code image 600 may be generated by the software development system as shown in FIG. 4. Binary code 600 may represent any of programs, such as an application, a library, a framework, etc. Referring to FIG. 6, binary code image 600 includes header 601, data section 602, code signing super blob 603, code directory 604, entitlements 605, signature 606, as well as other executable binary code (not shown). Header 601 may store loading information such as loading commands or sequence of binary code 600. For example, header 601 may include one or more pointers pointing to other sections (e.g., offsets), such as, code signing super blob 603. Code signing super blob 603 further includes one or more pointer linking other sections, such as, code directory 604, entitlements 605, and signature section 606. Signature section 606 includes a chain of certificates 613, which includes embedded therein team ID 614.

Hash section 612 are used to verify the integrity of other sections, such as for example, data section 602 and entitlement section 605, during loading of binary code 600. For example, when binary code 600 is compiled or code signed, a hash is generated based on a content image of data section 602 using a predetermined hash function or algorithm. The hash is then signed and stored in hash section 612. Subsequently, during loading of binary code 600, a new hash is generated based in content of data section 602 again and the new hash is compared with the corresponding hash stored in hash section 612 to verify the integrity of data section 602. Such a comparison would prevent someone from replacing data section 602 after the signing of binary code 600. Entitlement section 605 includes information specifying the resources (e.g., memory, network stack, IO devices) that binary code 600 is entitled to access during its execution. For example, entitlement section 605 may include information indicating whether an application is entitled to dynamically load and/or communicate with another application, a library, or a framework, etc. When a first program attempts to load and communicate with a second program, the entitlement of the first program is examined to determine whether the first program is entitled to communicate with the second program. If it is determined that the first program is entitled to communicate with the second program, the team IDs of the first and second programs may then be examined.

In one embodiment, when binary code 600 is loaded, team ID 614 is extracted from certificate 613. Team ID 614 is then compared with team ID 611 to determine if they are matched as part of verification of the integrity of binary code 600. Binary code 600 may be loaded only if team ID 611 matches team ID 614. Otherwise, the request to load binary code 600 may be denied. Subsequently, when binary code 600 attempts to load or communicate with another program, where the other program may be compiled into a binary code image similar to binary code 600. In response to the request to load or communicate with a second program, a code verifier or validation module (not shown, similar to library validation module 110) of an operating system extracts and compares team ID 611 with the corresponding team ID of the second program to determine whether they match. Binary code 600 is allowed to communicate with the second program only if their respective team IDs match.

Figure 7:
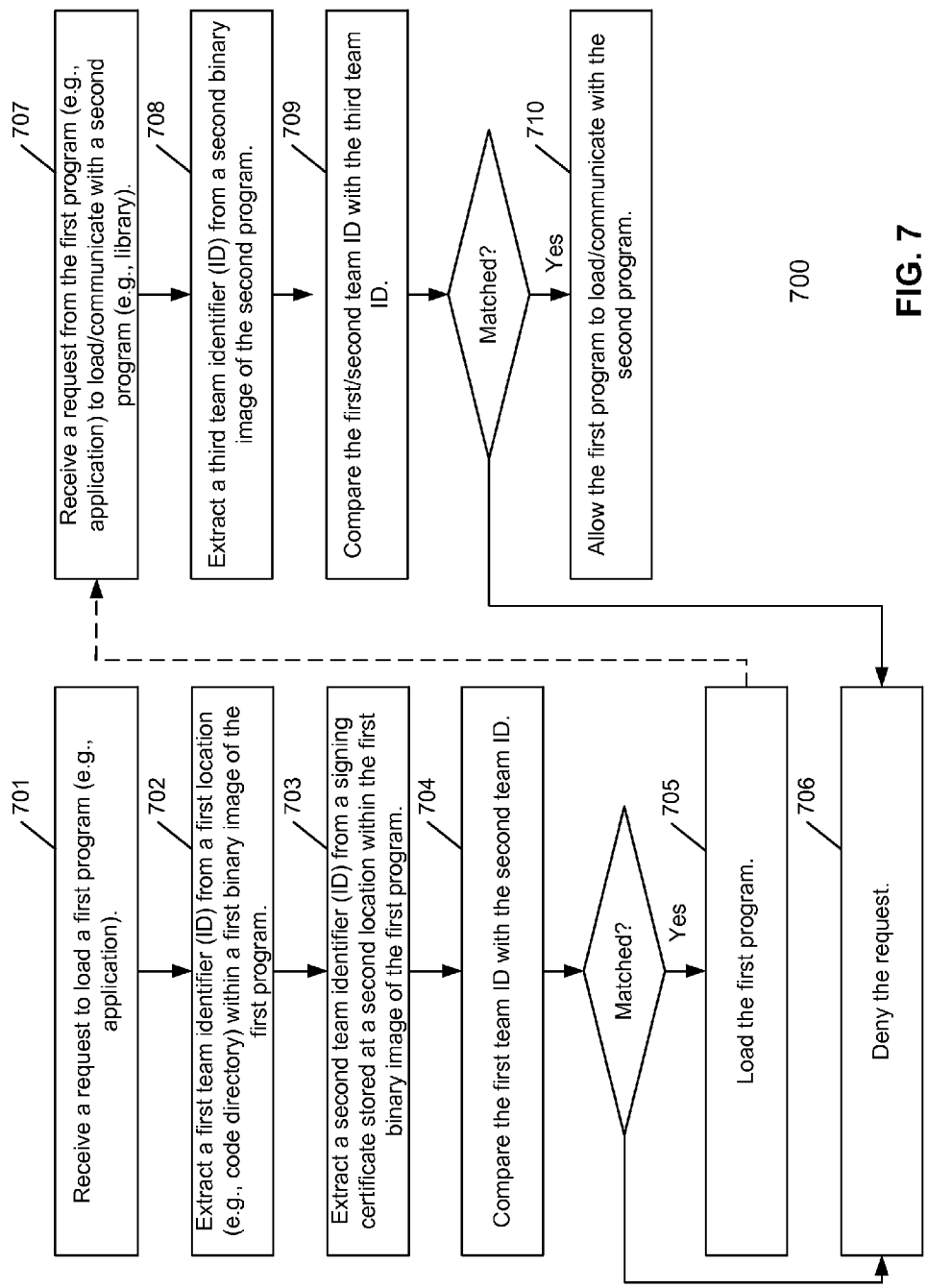
FIG. 7 is a flow diagram illustrating a process for verifying a program according to another embodiment of the invention.

FIG. 7 is a flow diagram illustrating a process for verifying a program according to another embodiment of the invention. Process 700 may be performed by processing logic that includes hardware (e.g. circuitry, dedicated logic, etc.), software (e.g., embodied on a non-transitory computer readable medium), or a combination thereof. Referring to FIG. 7, at block 701, processing logic receives a request to launch a first program (e.g., an application). In response to the request, at block 702, processing logic extracts a first team ID from a first location (e.g., code directory section) within a first binary image of the first program. At block 703, processing logic extracts a second team ID from a second location (e.g., certificate) within the first binary image. At block 703, processing logic compares the first team ID with the second team ID to determine whether they match. If the first and second team IDs match, at block 705, the first program is loaded and executed. Otherwise, at block 706, the request is denied. Subsequently at block 707, processing logic receives a request from the first program to load and/or communicate with a second program (e.g., a library). In response to the request, at block 708, processing logic extracts a third team ID from a binary image of the second program. At block 709, processing logic compares the first or second team ID with the third team ID to determine whether they match. If so, at block 710, the first program is allowed to load and/or communicate with the second program. Otherwise, the request is denied at block 706.

Note that some or all of the components as shown and described above (e.g., launch module 101 and/or library validation module 110 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
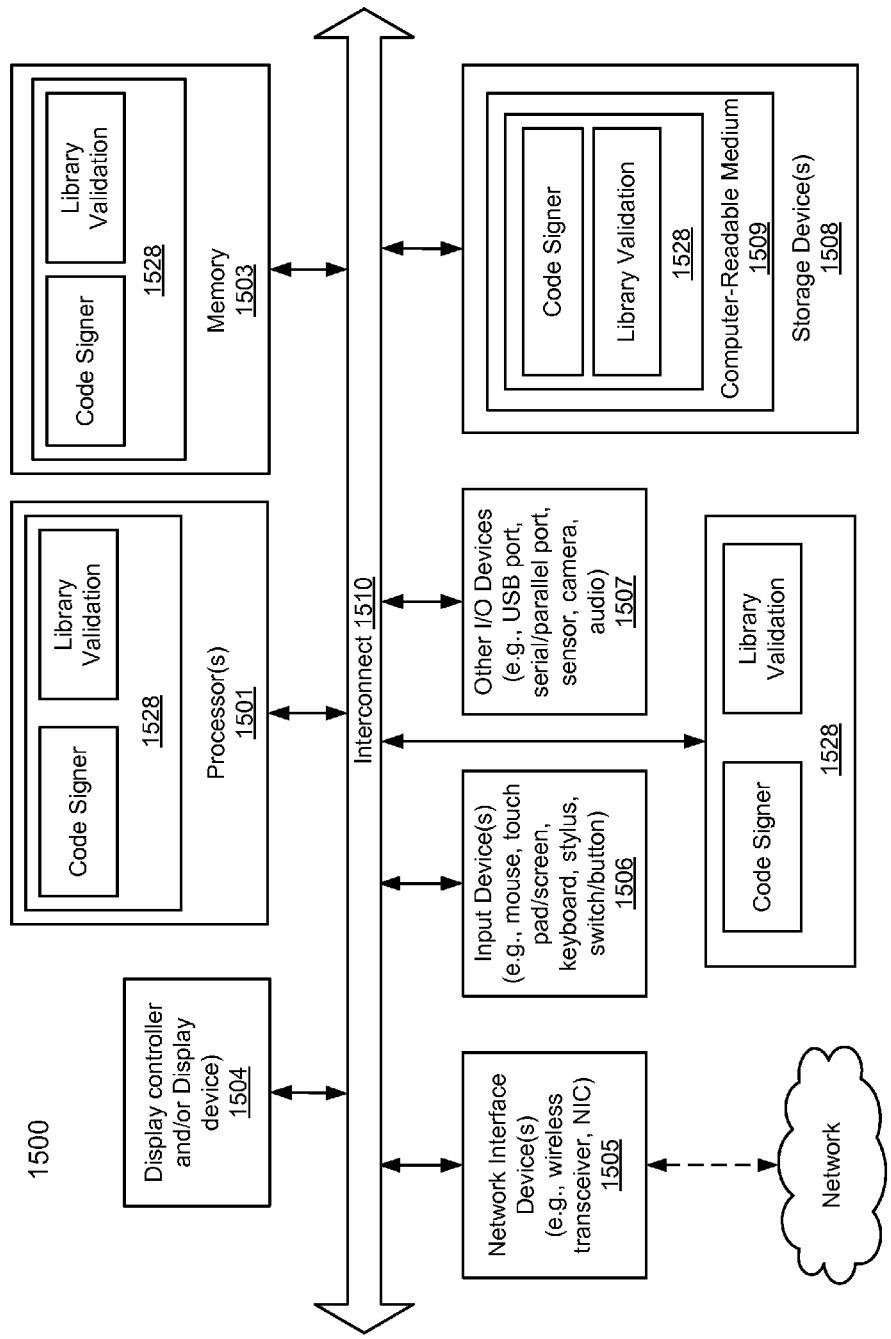
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example system 100 of FIG. 1 or system 400 of FIG. 4. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop (e.g., iMac™ available from Apple Inc.® of Cupertino, Calif.), a laptop (e.g., MacBook™), a tablet (e.g., iPad™), a server, a mobile phone (e.g., iPhone™), a media player (e.g., iPod™ or iPod Touch™), a personal digital assistant (PDA), a Smartwatch (e.g., Apple Watch™), a personal communicator, a gaming device, a network router or hub, a wireless access point (AP) or repeater, a set-top box (e.g., Apple TV™ box), or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, library validation module 110 of FIG. 1 and/or code signer 404 of FIG. 4. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for validating dynamically loaded libraries, the method comprising:
   in response to a request received from an application by a launch module hosted by an operating system of a data processing system and executed by a processor to dynamically load a library, extracting by a library validation module hosted by the operating system a first team identifier (ID) from the application, wherein the first team ID identifies an application provider that provides the application;
   extracting by the library validation module a second team ID from the library, wherein the second team ID identifies a library provider that provides the library;
   comparing the first team ID and the second team ID to determine whether the first team ID matches the second team ID;
   in response to determining that the first team ID matches the second team ID, launching by the launch module the library to allow the application communicate with the library; and
   denying the request if the first team ID does not match the second team ID.

2. The method of claim 1, wherein the first team ID is inserted into a first binary image of the application, and wherein the first binary image having the first team ID is signed using a first certificate provided by a trusted entity.

3. The method of claim 2, wherein the second team ID is inserted into a second binary image of the library, and wherein the second binary image having the second team ID is signed using a second certificate provided by the trusted entity.

4. The method of claim 3, further comprising examining the second certificate to determine whether the second certificate is still valid, wherein the comparison of the first team ID and the second team ID is performed only if the second certificate is still valid.

5. The method of claim 1, further comprising:
  determining whether the library is provided and installed as a bundle including the operating system in the data processing system; and
  loading the library in response to determining that the library is provided as part of operating system.

6. The method of claim 5, wherein determining whether the library is provided and installed as a bundle comprises determining whether the library has been installed and stored in a first predetermined directory of a file system associated with the operating system.

7. The method of claim 5, further comprising:
  determining whether the application is a third-party application that is not provided in the bundle; and
  performing comparing the first and second team IDs, in response to determining that the application is a third-party application.

8. The method of claim 7, wherein determining whether the application is provided in the bundle comprises determining whether the application has been installed and stored in a second predetermined directory of a file system associated with the operating system.

9. The method of claim 7, further comprising denying the request to load the library if the application is not a third-party application and the library is a third-party library.

10. A non-transitory machine-readable medium having instructions stored therein, which when executed by a processor, cause the processor to perform a method for validating dynamically loaded libraries, the method comprising:
  in response to a request received from an application by a launch module hosted by an operating system of a data processing system to dynamically load a library, extracting by a library validation module hosted by the operating system a first team identifier (ID) from the application, wherein the first team ID identifies an application provider that provides the application;
  extracting by the library validation module a second team ID from the library, wherein the second team ID identifies a library provider that provides the library;
  comparing the first team ID and the second team ID to determine whether the first team ID matches the second team ID;
  in response to determining that the first team ID matches the second team ID, launching by the launch module the library to allow the application communicate with the library; and
  denying the request if the first team ID does not match the second team ID.

11. The non-transitory machine-readable medium of claim 10, wherein the first team ID is inserted into a first binary image of the application, and wherein the first binary image having the first team ID is signed using a first certificate provided by a trusted entity.

12. The non-transitory machine-readable medium of claim 11, wherein the second team ID is inserted into a second binary image of the library, and wherein the second binary image having the second team ID is signed using a second certificate provided by the trusted entity.

13. The non-transitory machine-readable medium of claim 12, wherein the method further comprises examining the second certificate to determine whether the second certificate is still valid, wherein the comparison of the first team ID and the second team ID is performed only if the second certificate is still valid.

14. The non-transitory machine-readable medium of claim 10, wherein the method further comprises:
  determining whether the library is provided and installed as a bundle including the operating system in the data processing system; and
  loading the library in response to determining that the library is provided as part of operating system.

15. The non-transitory machine-readable medium of claim 14, wherein determining whether the library is provided and installed as a bundle comprises determining whether the library has been installed and stored in a first predetermined directory of a file system associated with the operating system.

16. The non-transitory machine-readable medium of claim 14, wherein the method further comprises:
  determining whether the application is a third-party application that is not provided in the bundle; and
  performing comparing the first and second team IDs, in response to determining that the application is a third-party application.

17. The non-transitory machine-readable medium of claim 16, wherein determining whether the application is provided in the bundle comprises determining whether the application has been installed and stored in a second predetermined directory of a file system associated with the operating system.

18. The non-transitory machine-readable medium of claim 16, wherein the method further comprises denying the request to load the library if the application is not a third-party application and the library is a third-party library.

19. A data processing system, comprising:
  a processor; and
  a memory storing instructions, which when executed by the processor, cause the processor to perform a method, the method including
    in response to a request received from an application by a launch module hosted by an operating system to dynamically load a library, extracting by a library validation module hosted by the operating system a first team identifier (ID) from the application, wherein the first team ID identifies an application provider that provides the application,
    extracting by the library validation module a second team ID from the library, wherein the second team ID identifies a library provider that provides the library,
    comparing the first team ID and the second team ID to determine whether the first team ID matches the second team ID,
    in response to determining that the first team ID matches the second team ID, launching by the launch module the library to allow the application communicate with the library, and
    denying the request if the first team ID does not match the second team ID.

20. The system of claim 19, wherein the first team ID is inserted into a first binary image of the application, and wherein the first binary image having the first team ID is signed using a first certificate provided by a trusted entity.

21. The system of claim 20, wherein the second team ID is inserted into a second binary image of the library, and wherein the second binary image having the second team ID is signed using a second certificate provided by the trusted entity.

22. The system of claim 21, wherein the method further comprises examining the second certificate to determine whether the second certificate is still valid, wherein the comparison of the first team ID and the second team ID is performed only if the second certificate is still valid.

23. A computer-implemented method for validating a dynamically loaded second program, the method comprising:
- receiving from a first program by a launch module hosted by an operating system and executed by a processor to dynamically load and communicate with the second program;
- extracting by a library validation module hosted by the operating system a first team identifier (ID) from the first program, wherein the first team ID identifies a first program provider that provides the first program;
- extracting by the library validation module a second team ID from the second program, wherein the second team ID identifies a second program provider that provides the second program;
- comparing the first team ID and the second team ID to determine whether the first team ID matches the second team ID;
- in response to determining that the first team ID matches the second team ID, launching by the launch module the second program to allow the first program communicate with the second program; and
- denying the request if the first team ID does not match the second team ID.

24. The method of claim 23, wherein the first team ID is inserted into a first binary image of the first program, and wherein the first binary image having the first team ID is signed using a first certificate provided by a trusted entity.

25. The method of claim 24, wherein the second team ID is inserted into a second binary image of the second program, and wherein the second binary image having the second team ID is signed using a second certificate provided by the trusted entity.

* * * * *

UNITED STATES PATENT AND TRADEMARK OFFICE
CERTIFICATE OF CORRECTION

PATENT NO. : 9,536,080 B2
APPLICATION NO. : 14/726292
DATED : January 3, 2017
INVENTOR(S) : Kerr et al.

It is certified that error appears in the above-identified patent and that said Letters Patent is hereby corrected as shown below:

In the Claims

In Column 17, Line 4: should read as indicated below.

23. A computer-implemented method for validating a dynamically loaded second program, the method comprising:
    receiving a request from a first program by a launch module hosted by an operating system and executed by a processor to dynamically load and communicate with the second program;
    extracting by a library validation module hosted by the operating system a first team identifier (ID) from the first program, wherein the first team ID identifies a first program provider that provides the first program;
    extracting by the library validation module a second team ID from the second program, wherein the second team ID identifies a second program provider that provides the second program;
    comparing the first team ID and the second team ID to determine whether the first team ID matches the second team ID;
    in response to determining that the first team ID matches the second team ID, launching by the launch module the second program to allow the first program communicate with the second program; and
    denying the request if the first team ID does not match the second team ID.

Signed and Sealed this
Tenth Day of April, 2018

Andrei Iancu
*Director of the United States Patent and Trademark Office*